US009795966B2

(12) United States Patent
Umbanhowar et al.

(10) Patent No.: US 9,795,966 B2
(45) Date of Patent: Oct. 24, 2017

(54) NON-CONTACT DROPLET MANIPULATION APPARATUS AND METHOD

(71) Applicants: Paul Umbanhowar, Evanston, IL (US); Kevin Lynch, Chicago, IL (US)

(72) Inventors: Paul Umbanhowar, Evanston, IL (US); Kevin Lynch, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/336,525

(22) Filed: Oct. 27, 2016

(65) Prior Publication Data

US 2017/0120249 A1 May 4, 2017

Related U.S. Application Data

(60) Provisional application No. 62/247,592, filed on Oct. 28, 2015.

(51) Int. Cl.
| | |
|---|---|
| *B65G 27/16* | (2006.01) |
| *F15D 1/00* | (2006.01) |
| *B01L 3/00* | (2006.01) |
| *F15C 1/04* | (2006.01) |
| *B01F 11/02* | (2006.01) |

(52) U.S. Cl.
CPC ........ *B01L 3/502792* (2013.01); *B65G 27/16* (2013.01); *F15D 1/00* (2013.01); *B01L 3/50273* (2013.01); *B01L 2200/0626* (2013.01); *B01L 2300/06* (2013.01); *B01L 2400/0406* (2013.01); *B01L 2400/0433* (2013.01); *B01L 2400/0493* (2013.01)

(58) Field of Classification Search
CPC ......... B01L 2200/0626; B01L 2300/06; B01L 2400/0433; B01L 2400/0493; B01L 3/502792; B01L 2300/0816; B01L 2400/0406; B01L 2400/0439; B01L 3/50273; Y10T 137/2191; F15D 1/00
See application file for complete search history.

(56) References Cited

U.S. PATENT DOCUMENTS

| | | | |
|---|---|---|---|
| 8,142,168 B2 | 3/2012 | Bohringer et al. | |
| 8,230,990 B2 * | 7/2012 | Lynch | B65G 27/00 198/752.1 |
| 8,348,047 B2 | 1/2013 | Lynch et al. | |
| 9,279,435 B2 | 3/2016 | Bohringer et al. | |

FOREIGN PATENT DOCUMENTS

| | | | | |
|---|---|---|---|---|
| CH | WO -2014029505 A1 * | 2/2014 | ........... | B01D 21/283 |
| EP | 2 096 628 A1 | 9/2009 | | |
| WO | WO 2007/128045 A1 | 11/2007 | | |

(Continued)

OTHER PUBLICATIONS

Couder, et al. "Walking and orbiting droplets", Nature, vol. 437, p. 208, Sep. 8, 2005.

(Continued)

*Primary Examiner* — Jennifer Wecker
(74) *Attorney, Agent, or Firm* — Cook Alex Ltd.

(57) ABSTRACT

The disclosure provides apparatus and methods of simultaneously levitating a droplet above a nominally rigid surface and controlling its position and motion in a direction along the nominally rigid surface generally for use in microfluidics.

23 Claims, 9 Drawing Sheets

(56) References Cited

FOREIGN PATENT DOCUMENTS

| WO | WO 2012/030435 A1 | 3/2012 |
|---|---|---|
| WO | WO 2014/029505 A1 | 2/2014 |
| WO | WO 2015/107014 A1 | 7/2015 |

OTHER PUBLICATIONS

Drinkwater, "Dynamic-field devices for the ultrasonic manipulation of microparticles", Lab Chip, vol. 16, pp. 2360-2375, (2016).

Gilet, et al., "Droplets bouncing on a wet, inclined surface", Physics of Fluids, vol. 24, pp. 122103-1-122103-18, (2012).

Gilet, et al., "Controlling the partial coalescence of a droplet on a vertically vibrated bath", Physical Review, vol. 76, pp. 035302-1-035302-4, (2007).

Gilet, et al., "Manipulation of Droplets onto a Planar Interface", Miller18, pp. 503-520, (2011).

Kaler, et al., "Droplet Microfluidics for Chip-Based Diagnostics", Sensors, vol. 14, pp. 23283-23306, (2014).

Kashima, et al., "Two-Dimensional Noncontact Transportation of Small Objects in Air Using Flexural Vibration of a Plate", IEEE Trans., vol. 62, No. 12, pp. 2161-2168, (2015).

Mark, et al., "Microfluidic lab-on-a-chip platforms: requirements, characteristics and applications", Chem. Soc. Rev., vol. 39, pp. 1153-1182 (2010).

Ruiter, et al., "Wettability-independent bouncing on flat surfaces mediated by thin air films", Nature Physics, vol. 11, pp. 48-53, Jan. 2015.

Shastry, et al., "Mico-Structured Surface Ratchets for Droplet Transport", IEEE Transducers & Eurosensors, pp. 1353-1356, (2007).

Terwagne, et al., "The role of the droplet deformations in the bouncing droplet dynamics", Physics of Fluids, vol. 25, pp. 122101-1-122101-15, (2013).

Trietsch, et al. Lab-on-a-chip technologies for massive parallel data generation in the life sciences: A review, Chem. and Intell. Lab. Sys., vol. 108, pp. 64-75, (2011).

\* cited by examiner

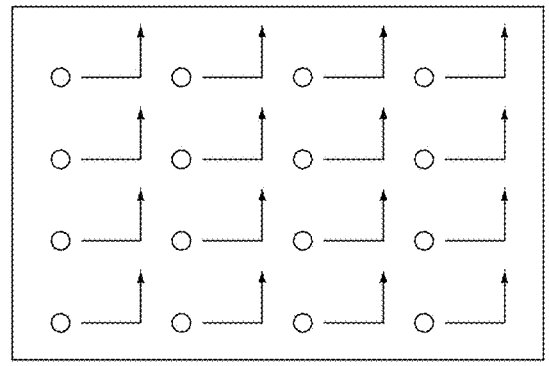
Fig. 7
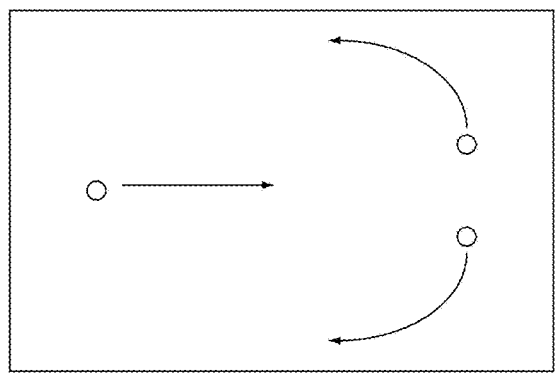
Fig. 8
Fig. 9a
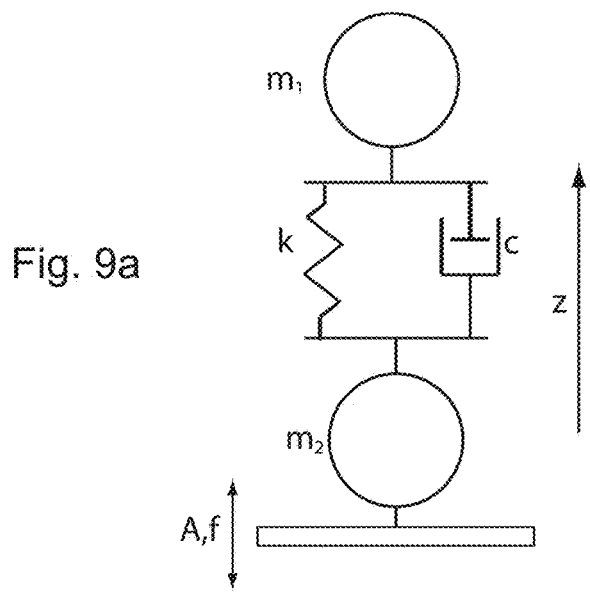

Translation

LineSink

LineSource

Shear

Sink

Source

Circle

DivCircle

Spiral

NON-CONTACT DROPLET MANIPULATION APPARATUS AND METHOD

CONTRACTUAL ORIGIN OF THE INVENTION

This invention was made with government support under CMM10700537 awarded by the National Science Foundation. The government has certain rights in the invention.

FIELD OF THE DISCLOSURE

This disclosure relates generally to microfluidics, and more particularly to apparatus and methods of simultaneously levitating a droplet above a surface and controlling its position and motion in a direction along the surface.

BACKGROUND

The ability to manipulate small droplets drives technology in many important fields that are vital to the well-being and advancement of society including medicine, chemistry, and biology. The droplets include liquid and may be exclusively liquid or include a gel, a colloid, an emulsion or a liquid-coated solid particle. Examples of uses in such fields include screening for drug efficacy and interaction, ecological and biological contaminants, and gene expression. Increasingly, keys to success have been found in reducing the volume of liquid required per operation, increasing the speed of operations, parallelizing operations, and decreasing operation cost. Driven by these requirements, miniature liquid manipulation lab-on-a-chip (LoC) devices, such as the prior art device shown in FIG. 1, have been developed to pump, meter, mix, and separate liquids with volumetric resolution on the order of nanoliters. LoC platforms offer a generic and consistent way to miniaturize, automate and parallelize chemical and bio-chemical processes.

Prior art LoC devices typically handle liquids continuously or in droplets (digital). Digital-fluidic devices manipulate droplets by surrounding them in an immiscible fluid and forcing them through predefined channels; by using surface interactions such as electrowetting, surface acoustic waves (SAW), heterogeneous (textured) sufaces or other means that require the liquid to contact the surface; or by using acoustic radiation generated by arrays of ultrasonic actuators.

Thus, existing LoCs suffer from fundamental limitations of requiring surfaces that must be patterned (e.g., physical channels and/or chemical traces, such as hydrophobic/hydrophillic coatings, to direct transport of droplets) or equipped with actuators (e.g., electrodes and piezo-electric materials for SAWs and acoustic levitators), and/or the use of a second carrier liquid. These requirements add cost and complexity. Most LoCs also require the manipulated droplet to contact the surface of the device or the carrier fluid, which raises the possibility of contamination and the need for chemical and physical (e.g., wetting angle for solid surfaces and insolubility for carrier fluids) compatibility between materials.

To put the present disclosure in context, we first provide a brief review of related work on microfluidic manipulation, with a focus on techniques used in LoC devices and then discuss work on gas-layer-mediated interaction of droplets with surfaces.

Microfluidics

Microfluidics is the study of fluids at small length and volume scales, typically in amounts less than 1 microliter, which corresponds to a droplet diameter of slightly more than a millimeter. The amount of work in the field has grown dramatically in the last 15 years. Much of the effort in microfluidics is concerned with the manipulation of liquids, the most common operations being transport, mixing, and segregation. Fluid is processed as continuous streams contained in small pipes or channels or as droplets which are manipulated on planar surfaces and surrounded by a second immiscible fluid which can be a liquid or a gas. Hybrid methods also exist in which droplets are formed and processed within channels. The most important technological applications of microfluidic manipulation are in LoC devices. LoC devices are miniature laboratories, typically planar with overall dimensions on the centimeter scale, that combine the abilities to aliquot, separate, mix, and transport fluids with dedicated sensors that measure a wide variety of physical, chemical, and biological properties using optical and electronic means. We next describe existing fluid handling methods used in LoC devices and their limitations, so that the potential advantages and novelty of the microfluidic manipulation method disclosed herein can be placed in context.

Flows

Many prior art LoC devices handle fluids in a conventional macroscopic-way using closed channels or pipes. Rather than connecting together many tiny tubes, small channels are instead formed in the surface of a material using lithography-based approaches, shown for example in FIG. 1. Presently, most devices are fabricated from the silicon compound polydimethylsiloxane (PDMS) using a technique known as soft-lithography. After etching, closed channels are formed by bonding a second material, usually glass, to the etched side of the original surface. Channel widths as small as 50 nm are possible using soft-lithographic techniques. All flow-based technologies must deal with the problem of surface contamination, which can occur during fabrication and assembly or from residual material from a previous use of the surface. Even on the most liquid-phobic surfaces (e.g., hydro- or oleophobic), a film of liquid remains after the bulk of the fluid has passed or been removed, enabling potential contamination. Additionally, continuous flow devices must be partially or completely filled before they are functional which necessarily requires more material.

For fluids to flow in microchannels, forces must be applied to counteract viscous drag. Typically, pressure differences are created across the channels to induce Poiseuille flow, Pressures are frequently created using sources of compressed gas, or pumps, which can be external or integrated in the LoC device. Pressure differences can also be achieved by rapidly rotating a circular LoC with a primarily radial channel geometry centered on the axis of rotation. Pressure driven flows have the disadvantage that volumetric flow rates depend on the impedance of the channel, which can change if residues build up on the channel walls.

Flows are also driven by linear actuators (e.g., motorized syringes) which dispense fluid at fixed volumetric flow rates. However, unless each channel is driven by a dedicated actuator, flow rates in individual channels will differ due to impedance differences associated with varying channel length and cross-sectional area. An additional disadvantage is the need to connect the external actuators to the LoC, as shown in FIG. 1.

The last common method of driving flows in channels is electrokinetics, which makes use of electric fields and charges, either intrinsic (e.g., from ionic solutions) or dipoles which can either be intrinsic or induced. There are many variations on this technique, with electroosmotic flow (EOF) being arguably the most prevalent. In EOF driving, an electric potential is applied between the insulated walls of the channel and the fluid which induces charge separation at the wall. An electric field applied along the length of the channel causes the charges in the fluid to move. The charges moving in the fluid drag the surrounding fluid and the fluid interior to the channel due to viscous coupling. Aside from the surface contact problems associated with all channel flows, electrokinetic flows also have to contend with resistive heating, pH gradients caused by the applied fields, and the potential for bubble generation and solids buildup at the driving electrodes due to electrolysis.

Droplets

A competing technique to continuous flows is the handling of materials in droplet form. This method, known as digital-microfluidics, surrounds droplets with an immiscible fluid (gas or liquid) and shuttles them about on or above a surface using various physical forces realized through heterogeneous surface structures. There is some overlap between continuous flow and droplet manipulation methods, in particular, a technique known as segmented flow microfluidics in which plugs of fluids or droplets are dispersed in a surrounding immiscible fluid. However, as the limitations associated with closed channels and their various driving mechanisms are the same, we do not discuss this method further. Below we describe some common droplet manipulation techniques used in LoC devices, all of which restrict manipulation to patterned areas and, except as noted, require surface contact.

Electrowetting

When a liquid contacts a surface, a contact line is formed at the liquid/fluid/solid interface that is characterized by the angle $\phi_c$ between this interface and the plane of the surface. The "contact angle" is a function of the intermolecular forces and is low when the liquid molecules are more strongly attracted to the surface than each other and high (e.g., water on wax) when the liquid molecules are more strongly attracted to each other than the surface molecules.

The wetting angle can be modified by many factors, including the electrical potential difference between the fluid and the surface. Increasing the potential difference between the liquid and the substrate reduces the contact angle, which causes the edges of the droplet to move outward. The effect can be exploited to move droplets on a surface patterned with multiple electrodes and covered by a common single transparent electrode on the top. FIG. 2, which is reprinted from Article A (see the listing of Articles hereinbelow), shows such a prior art device with square electrodes. The electrode beneath the droplet on the far left of FIG. 2 is energized while the surrounding eight electrodes are at the same potential as the droplet. When an adjacent electrode is energized and the one beneath it de-energized, the droplet flows onto the energized electrode. The image also shows droplets being split and aliquoted from a reservoir.

By repeating the basic voltage pattern, electrowetting can move droplets wherever electrodes have been placed. However, since droplets contact the surface, this technique is at risk for contamination and interaction with residual films of fluid. Similarly, the different wetting properties of different liquids (for example, different blood samples) influence the transport properties. For example, it takes longer for a droplet with higher viscosity to transfer between electrodes, and if this time is significantly longer than the switching time, it could cause the drop to be split or lose spatial coherence with the driving signal.

Surface Acoustic Waves (SAW)

Surface acoustic waves (SAW) are elastic waves that propagate along solid surfaces. In LoC devices, SAWs have amplitudes on the order of nanometers and are typically generated by applying interdigitated electrodes to a piezoelectric surface. When a potential difference is applied between the electrodes, the surface either expands or contracts depending on its structures and the sign of the voltage. Driven at high voltage and with frequencies tuned to match the surface dispersion relation, traveling surface waves are emitted.

Two types of SAW-based manipulation have been explored: traveling surface acoustic wave SAW (TSAW) and standing surface acoustic wave (SSAW). Both make use of liquid-phobic coatings to reduce wetting and the forces required to move droplets. In TSAW, a single piezoelectric actuator generates a propagating wave that travels away from the device. When the wave encounters a droplet resting on the surface it is strongly attenuated and transfers its mechanical energy into the nearest edge of the droplet, generating an internal circulation via acoustic streaming which drives the drop in the direction of wave propagation, as shown in the prior art FIG. 3, which is reprinted from Article B. In SSAW, two actuators are used to generate a standing wave between them. Droplets in this field move to nodes where energy transfer is minimal. Droplets are moved by varying the relative phase of the two waves which shifts the positions of the nodes and thus the droplets.

LoC implementation of SAW methods can move droplets at relatively high speeds and are inexpensive to manufacture, due to the use of SAWs in numerous consumer electronic applications and this technique is subject to contamination. However, transducer density is limited due to unwanted wave interference, and the droplet paths are limited by the locations and orientations of the actuators.

Anisotropic Surfaces

As described above, electrowetting manipulates droplets by using an electric field to create gradients in surface energy at their edges, causing them to move. Other techniques for achieving gradients in contact line surface energy rely on permanent chemical or mechanical alteration of the surface. In one method, a gradient in the interfacial energy was produced by depositing a hydrophobic silane film whose density increased in one direction along the otherwise hydrophilic substrate. A droplet placed on the hydrophobic end spontaneously moved to the hydrophilic end but at an undesirably slow speed due to an effect known as contact angle hysteresis. To increase the speed, the substrate was vibrated horizontally which resulted in a "rectified" motion in which the droplet's trailing edge moved forward but, due to the hysteresis, did not cause its leading edge to move backwards. In a related approach, surface anisotropy was realized by locally varying the surface density of small hydrophobic surface posts on which the droplet sits, as shown in the prior art FIG. 4, which shows a patterned surface to drive a droplet (superimposed image) using surface energy inhomogeneity, and is reprinted from Article C. Droplets are pinned within a local energy gradient minima, but can be moved in a single direction (rectified motion) by symmetric horizontal substrate vibration.

Levitation

Non-surface-contacting droplet transport can be achieved via the Leidenfrost effect, in which droplets are levitated on a layer of gas due to droplet evaporation. The Leidenfrost effect can be observed, for example, in the skittering of water droplets introduced onto a hot pan whose temperature exceeds approximately 200° C. When a droplet approaches a sufficiently hot surface it immediately begins to evaporate.

The evaporating gas of the droplet along the heated surface causes the droplet to levitate above the surface and skitter around until it completely evaporates. Although not yet employed in LoC devices, authors have recently described methods of controlling Leidenfrost droplet motion using asymmetric sawtooth-like patterning of the surface. When placed on a patterned surface, droplets travel in the direction where they are descending the less steep portion of the sawtooth-like surface and can even be made to climb up the surface when it is inclined. By adding additional features to the surface grooves, droplets can be made to turn relative to the grooves as the substrate temperature is varied. Although Leidenfrost droplet manipulation does not require surface contact, it does require surface patterning, which restricts possible movement directions, and, most seriously, material is lost and droplet lifetime limited by the necessity of evaporation to produce the gas layer that drives levitation. Leidenfrost droplet manipulation also disadvantageously requires heat, and the heat may detrimentally affect the liquid droplet in other ways.

Another non-contact method that is rapidly developing uses acoustic radiation forces to manipulate droplets in LoCs (see Article C). This method is similar to the SAW technique, but generates high intensity standing waves in air using an array of ultrasonic actuators embedded in the surface and a reflector placed above the surface. Material is suspended in acoustic nodes whose positions vary with the size, density, and compressibility of the suspended material. In static devices, material collects at acoustic nodes, while in dynamic devices the acoustic radiation field is changed in time to pass objects between elements, similar to the electrowetting devices described above. Acoustic methods are inherently non-surface-contacting and chemically compatible with most materials. However, their operation is sensitive to physical properties of the manipulated material and requires synchronized arrays of transmitters which limit spatial resolution and increase device complexity. A related technique that uses four ultrasonic actuators to excite short wavelength modes in a surface formed from a flexible plate does not require large arrays of transmitters (see Article CC), but is limited in its ability to manipulate objects by the modal structure of the plate.

SUMMARY

To overcome the limitations of existing LoC technologies and advance the state of the art in microfluidic droplet manipulation, the present disclosure uses methods and apparatus in which droplets can be indefinitely maintained above a solid or liquid surface that is vibrating vertically. The methods and apparatus manipulate droplets without the need for channels, surface coatings, or surface actuators and without the requirement of direct physical contact with a surface of the device or a carrier liquid. One or more droplets may be manipulated and the droplets include liquid and may be exclusively liquid or include a gel, a colloid, an emulsion or a liquid-coated solid particle.

Vertical vibration of a flat surface is used to bounce droplets above the surface on a thin layer of fluid, such as a liquid or gas, while horizontal vibrations are used to move the droplets across the surface. FIG. 5 represents a simplified view of a surface and relative orientations of the x, y and z axes, as well as movements that may be referred to as roll, pitch and yaw.

Apparatus that may be ulitized may include a vibratory platform having one or more controlled degrees of freedom. Using vibration waveforms as a input, the apparatus may control a single droplet along a programmable trajectory tangent to the surface, or it may control multiple droplets to move in concert with each other or, optionally, along substantially independent programmable trajectories. Thus, the apparatus may achieve simultaneous controlled trajectories of droplets as a function of vibration waveforms, and simultaneous control of the trajectories of multiple droplets.

The present disclosure utilizes modeling and control of droplets levitated by vibration and translated by forces transmitted by a moving and nominally rigid surface through an isolating fluid layer, such as of a liquid or a gas, including for example an ambient gas. It will be appreciated that in the context of this disclosure, a nominally rigid surface is either a surface constructed of a solid material or is a surface of a liquid layer or film without periodic waves, and the isolating layer be referred to as a bounce layer.

While being applicable to uniform surfaces, the disclosed methods will enhance the capabilities of highly engineered droplet manipulation systems, like the LoC devices that are currently driving advances in microfluidic processing. Control may be provided for droplets levitated above both liquid and solid interfaces. Teachings of this disclosure will provide new capabilities for microfluidics and the closely associated LoC devices.

In a first aspect, the present disclosure provides a method of imparting movement to one or more droplets, with the method including placing the one or more droplets above a nominally rigid surface of a support member, wherein the one or more droplets and the nominally rigid surface of the support layer are within or surrounded by an ambient fluid comprising a liquid or gas, and imparting vibratory motion to the support member, wherein the vibratory motion of the support member includes a locally time-varying vertical component of motion and a locally time-varying horizontal component of motion, and wherein a bounce layer formed from the ambient fluid and the vibratory motion prevent the one or more droplets from wetting or coalescing with the surface of the support member and produces movement of the one or more droplets tangent to the surface of the support member.

In a second aspect, the present disclosure provides an apparatus for imparting movement to one or more droplets, with the apparatus including a support member having a nominally rigid surface above which the one or more droplets are disposed, wherein the one or more droplets and the nominally rigid surface of the support member are within or surrounded by an ambient fluid comprising a liquid or gas, one or more actuator devices for imparting vibratory motion to the support member, wherein the vibratory motion includes a locally time-varying vertical component of motion and a locally time-varying horizontal component of motion, and a controller for providing electrical signals to the one or more actuator devices, wherein a bounce layer formed from the ambient fluid and the vibratory motion prevents the one or more droplets from wetting or coalescing with the surface of the support member or from contacting the surface of the support member and produces movement of the one or more droplets tangent to the surface of the support member.

BRIEF DESCRIPTION OF THE DRAWINGS

In describing the preferred embodiments, reference is made to the accompanying drawing figures wherein like parts have like reference numerals, and wherein:

FIG. 7 shows a representation of a plurality of droplets being transported in the same pattern.

FIG. 8 shows a representation of a plurality of droplets being simultaneously controlled along individual trajectories.

FIG. 9a shows a droplet bouncing model for a vertically vibrating surface.

FIG. 9b low bouncing mode (1,1); FIG. 9c high bouncing mode (1,1); FIG. 9d period-2 bouncing mode (2,1).

It should be understood that the drawings are not to scale. While some details of apparatus and methods and other plan and section views of particular components have not been included, such details are considered to be within the comprehension of those of skill in the art in light of the present disclosure. It also should be understood that the present invention is not limited to the examples illustrated.

DETAILED DESCRIPTION

Although the following discloses examples of apparatus and methods to achieve non-contact simultaneous levitation and manipulation of droplets using programmable vibration, persons of ordinary skill in the art will appreciate that the teachings of this disclosure are in no way limited to the specific examples shown. On the contrary, it is contemplated that the teachings of this disclosure may be implemented in alternative configurations, with alternative apparatus and in alternative environments.

Figure 1:
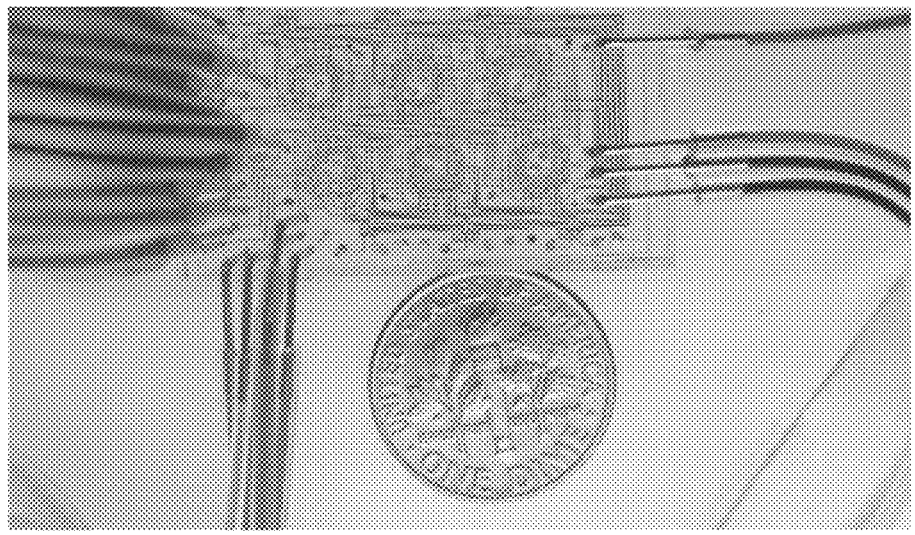
FIG. 1 shows a representation of prior art Lab on Chip (LoC) technology wherein fluid flows in channels on a surface.
Figure 2:
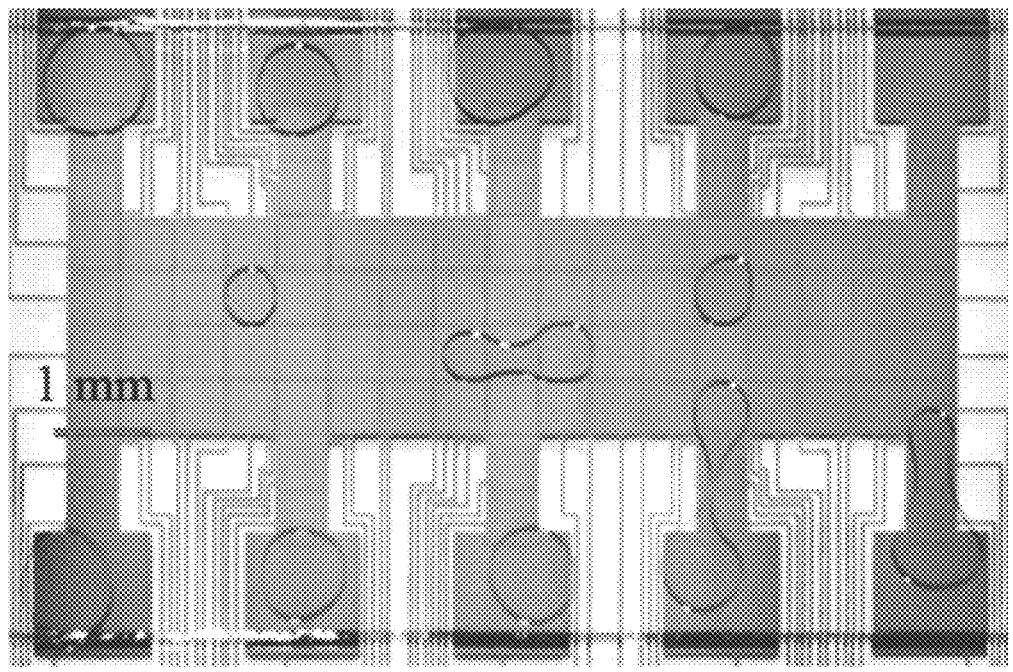
FIG. 2 shows a prior art representation of an electrowetting device.
Figure 3:
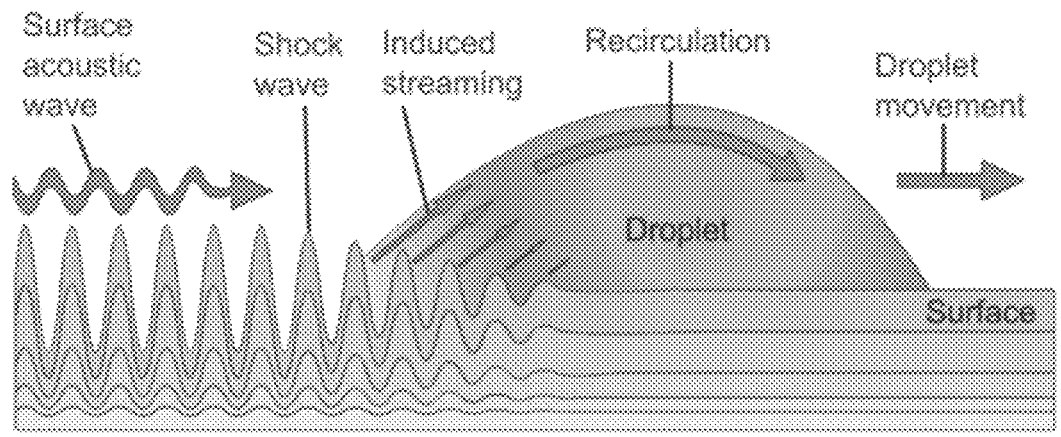
FIG. 3 shows a prior art representation of surface acoustic wave driven droplet transport.
Figure 4:
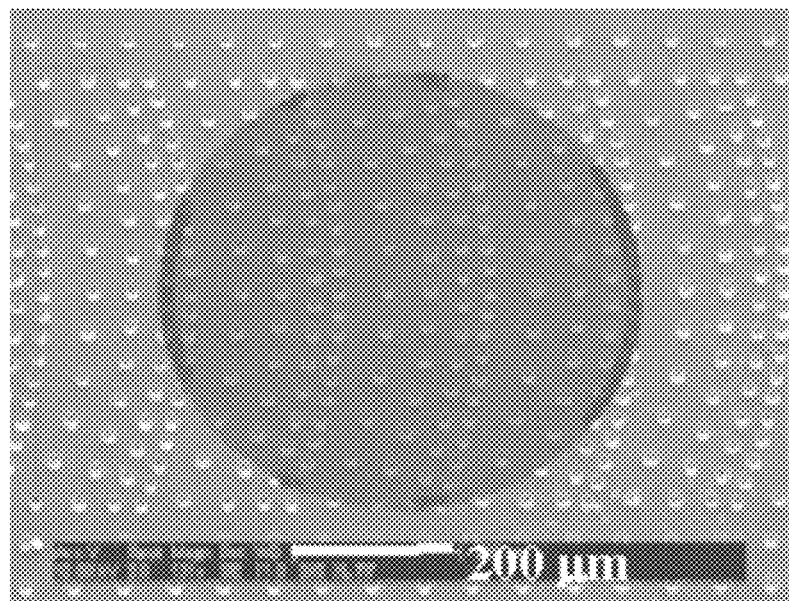
FIG. 4 shows a prior art representation of a patterned surface to drive a droplet using surface energy inhomogeneity.
Figure 5:
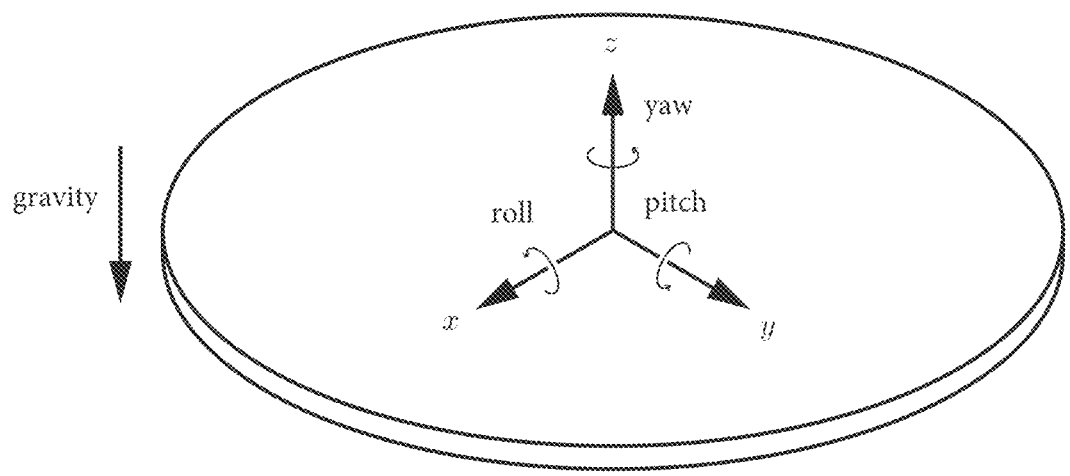
FIG. 5 shows a simplified view of a surface and relative orientations of the x, y and z axes, as well as movements that may be referred to as roll, pitch and yaw.
Figure 6:
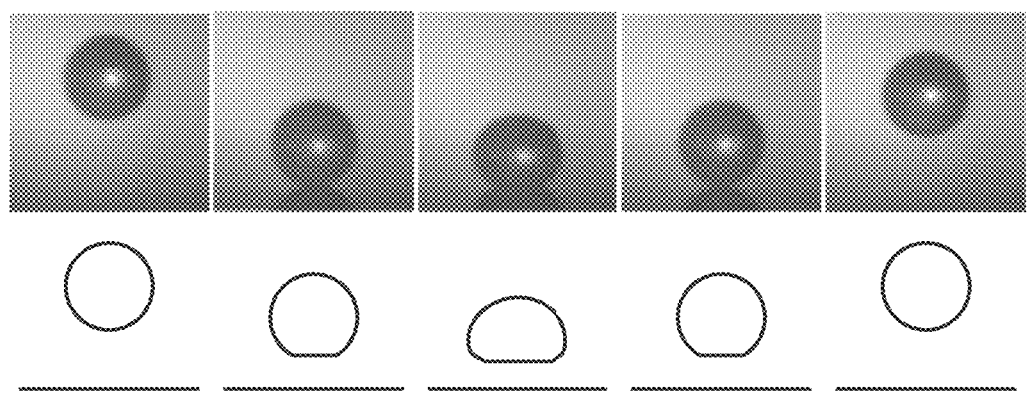
FIG. 6 shows a prior art representation of a bouncing droplet isolated from a surface by a fluid bounce layer, here a thin cushion of air, as well as a sketch that is out of scale to more dramatically depict the bounce layer.

It will be appreciated that a brief discussion of some of the foundational information will facilitate a better understanding of the present innovations. Thus, we begin with noting that, for a range of droplet diameters and fluid parameters (e.g., density, $\rho$, kinematic viscosity, $v$, and surface tension, $\sigma$), a thin bounce layer of gas (or other ambient fluid) is temporarily trapped between the impacting droplet and the surface. If the intrinsic collision duration of the droplet is less than the time it takes the bounce layer to thin to the point of wetting (for solid surfaces) or coalescence (liquid surfaces), then the droplet will rebound, as shown for a 0.8 mm droplet in the prior art image in FIG. 6, together with a sketch that is out of scale to emphasize the presence of the bounce layer. Due to viscous forces that act during the collision, energy is lost and the droplet eventually stops bouncing and contacts the surface, as the bounce layer thins to the point that intermolecular forces pull the surfaces together. However, if the surface is vertically oscillated, center-of-mass (CM) energy is added to the system during contact with the bounce layer, which balances the energy lost to viscous forces, allowing the droplet to bounce indefinitely like a dribbled basketball.

The physics controlling the interactions of the droplet with the surface, and thus the appropriate control methods, is determined by the relative deformation of the droplet and the surface during the bounce which are characterized by the Ohnesorge numbers of the droplet, $Oh_d$, and the surface, $Oh_s$, respectively. The Ohnesorge number characterizes the damping of oscillations by viscosity:

$$Oh = v\sqrt{\frac{\rho}{\sigma R}}$$

where R is the droplet radius which, for bouncing droplets, is also the characteristic curvature of the surface. When Oh is O (1), surfaces are largely undeformed—droplets are close to spherical and surfaces are essentially flat. When Oh<<1, surfaces deform and oscillate. When $(Oh_d, Oh_s)=(1,1)$ the physics of the problem are quite similar to those of a solid ball bouncing on a rigid substrate. When the surface is undeformed ($Oh_s=1$), horizontal forces can only be transmitted to a droplet via shear forces in the intervening bounce layer. However, when the surface deforms ($Oh_s<<1$), the bounce layer is no longer entirely horizontal, which allows pressure forces to accelerate the droplet in the plane.

The present disclosure uses vibrationally induced levitation via bouncing of droplets on a thin bounce layer as the basis for a new method of microfluidic droplet transport and manipulation. Droplet movement is controlled by using a largely undeformed surface, in the form of a solid surface or a high viscosity and/or shallow depth liquid surface. The undeformed surface is used to apply forces in the bounce layer, which are induced by horizontal motion between the droplet and the surface. To achieve horizontal droplet transport the surface is vibrated horizontally and may be vibrated about its three independent axes, in addition to the vertical levitation-inducing vibration. The proposed method is novel and advantageous, but remains compatible with much existing LoC technology, such as optical and capacitive sensors which do not require direct droplet contact.

For example, to utilize existing surface embedded actuators (e.g., to split, merge, and mix droplets), droplets can be positioned above them and then allowed to contact the surface by decreasing the vertical vibration. The method is inherently parallel and can be run either open or closed loop.

The inventors have pioneered an approach to manipulating planar parts sliding under the influence of friction on a vibrating surface. In the approach, an average horizontal part velocity is realized by breaking the temporal symmetry of the horizontal frictional force. Symmetry-breaking can be achieved through various means including: (a) creating asymmetric horizontal motions; (b) making the tangential friction force asymmetric; and (c) making the surface anisotropic. The present disclosure wishes to avoid method (c) and to not use anisotropic surfaces such as those employed in previous work moving contacting droplets with horizontal vibration or in non-contacting Leidenfrost droplets, as surface anisotropy is not easily made programmable. With method (a) on its own it is not possible for droplets due to their bouncing motion, and even if droplets were levitated at a fixed height, e.g., by using acoustic levitation, the method would not work due to the low Reynolds numbers in the bounce layer which makes the viscous drag force linearly dependent on the relative velocity and negates the effect of asymmetric driving. (This is not the case for frictional forces because the magnitude of the frictional force is independent of the relative velocity between the surfaces.) However, method (b), where symmetry is broken by controlling the magnitude of the tangential force, allows vibrationally levitated droplets to be manipulated in the horizontal plane.

In the case of frictional manipulation using method (b), the magnitude of the in-plane friction force, $$F_\mu = \mu m(g+a),$$

is modulated by varying the vertical acceleration of the surface, a, where $\mu$ is the friction coefficient and g the acceleration due to gravity. When the relative phase, $\phi$, of the vertical and horizontal accelerations is not 0 or $\pi$ and the part is continuously sliding, $$<F_\mu> = \frac{1}{T}\int_0^T F_\mu(t)\,dt \neq 0$$

and the part will have a non-zero cycle-averaged acceleration until it reaches a constant non-zero average velocity. An analogous asymmetry can be achieved for the bouncing droplet which depends primarily on the relative phase of the droplet impact and the horizontal vibration. For example, one may consider a "high-bouncing" droplet that is only close to the surface for a fraction of the vibration cycle and is bouncing with the same frequency as the horizontal vibration. If the droplet is initially moving only vertically and the surface has a horizontal component of velocity in the $+\hat{x}$ direction while the drop is engaging the bounce layer on the surface, viscous drag forces exerted through shear in the bounce layer increase the droplet velocity in the $+\hat{x}$ direction until the droplet velocity matches the surface velocity during the bounce. Changing the horizontal vibration phase by $\pi$ causes the droplet to accelerate in the opposite direction.

The present disclosure concerns vibrational manipulation of droplets levitated above a liquid or solid surface without the need for channels, surface coatings, or surface actuators or the necessity of direct physical contact of the droplet with the device. Simultaneous vertical, horizontal and rotational vibration of the surface are used to create droplet actuation forces, and then these forces are used to simultaneously move droplets between any locations on the surface, as well as along specific trajectories. One outcome of the system would be for general purpose non-surface-contact droplet transport, an example of which is shown in FIG. 7, which is a top view of many droplets being transported simultaneously in the same pattern. Another example is shown in FIG. 8, which is a top view of droplets being simultaneously controlled along individual trajectories on a single six degree of freedom vibrating surface.

Bouncing Droplets

The apparatus and methods of the present disclosure make use of the recent discovery of vibrationally levitated droplets bouncing on a thin bounce layer of gas (or other fluid) formed from the ambient background during the approach of the droplet to the surface. In the context of LoC devices, levitation eliminates the possibility of surface contamination through contact. The influence of gas surrounding droplets on interactions with other droplets and surfaces was studied by such eminent scientists as Lord Rayleigh, who used it to explain the rebound of two colliding liquid droplets, and Johann Leidenfrost whose eponymous effect was described above. However, it is only recently that the significant role of the encompassing ambient fluid in natural and technological droplet applications has begun to be fully appreciated.

Collisions

Experience with falling water droplets tells us that, under normal conditions, droplets do not bounce. But, under the right conditions, colliding liquid droplets have been observed to rebound from liquid surfaces, and both poorly wetting, as well as highly wetting solid surfaces, the last discovery having been made in 2014. Initially, bouncing was only reported for droplets impacting highly hydrophobic surfaces such as pea leaves in 1958 and a man-made super-hydrophobic surface in 2000. In the case of droplets rebounding from other liquids and highly wetting solid surfaces, a continuous thin layer of ambient fluid, which is referred to herein as a bounce layer, prevents the droplet from contacting the surface. Indeed, a bounce layer is maintained between the droplet and the surface during the entire duration of the interaction for sufficiently low impact velocity (<0.5 m/s for millimeter diameter droplets). If the impact velocity is too large, the bounce layer ruptures, there is surface contact, and no rebound occurs. On poorly wetting surfaces, drops can rebound even if the bounce layer ruptures, a case we do not examine in the context of LoC technology due to the possibility of contamination and fluid attrition. On solid surfaces, in contrast to liquids, surface roughness can rupture the bounce layer if it is similar in scale to the thickness of the bounce layer.

TABLE 1

Material parameters, kinematic variables, and dimensionless numbers for gas mediated droplet levitation

| Symbol | Description |
| --- | --- |
| Droplet properties | |
| R | Droplet radius |
| D | Droplet diameter = 2R |
| ρ | Droplet density |
| η | Droplet dynamic viscosity |
| ν | Droplet kinematic viscosity = η/ρ |
| σ | Droplet surface tension |
| $\omega_d$ | Characteristic droplet oscillation frequency = $\sqrt{\sigma/\rho R^3}$ |
| $t_c$ | Droplet collision duration |
| Gas properties | |
| ρ | Gas density |
| $\eta_g$ | Gas dynamic viscosity |

TABLE 1-continued

Material parameters, kinematic variables, and dimensionless numbers for gas mediated droplet levitation

| Symbol | Description |
|---|---|
| $\nu_g$ | Gas kinematic viscosity = $\eta_g/\rho_g$ |
| | Properties of fluid surfaces |
| $\rho_s$ | Surface density (fluid) |
| $\eta_s$ | Surface dynamic viscosity (fluid) |
| $\nu_s$ | Surface kinematic viscosity = $\eta_s/\rho_s$ |
| $\sigma_s$ | Surface tension (fluid) |
| l | Surface fluid depth |
| | Kinematics |
| $V_I$ | Droplet impact velocity |
| $V_F$ | Droplet rebound velocity |
| e | Restitution coefficient = $V_F/V_I$ |
| g | Acceleration due to gravity |
| f | Surface vibration frequency |
| $\omega$ | Surface vibration frequency = $2\pi f$ |
| A | Vibration displacement amplitude |
| | Dimensionless groups |
| $\Gamma$ | Non-dimensional vibration acceleration amplitude = $A\omega^2/g$ |
| We | Weber number = $\rho R V_I^2/\sigma$ |
| Bo | Bond number = $\rho g R^2/\sigma$ |
| Oh | Droplet Ohnesorge number = $\eta/\sqrt{\sigma \rho R}$ |
| $Oh_s$ | Surface Ohnesorge number (fluid) = $\eta_s/\sqrt{\sigma_s \rho_s R}$ |
| St | Inverse Stokes number = $\eta_g/(\rho V_I R)$ |
| $\Omega$ | Non-dimensional surface oscillation frequency = $\omega/\omega_d$ |

The details of bounce-layer-mediated droplet impact are determined by the various material parameters of the droplet, the ambient fluid, and the surface, as well as the impact velocity, the acceleration of gravity, and any oscillations of the droplet or surface present before impact (Table 1). These physical factors can be combined into four characteristic dimensionless groups that compare the relative importance of: (a) inertia to surface tension, We; (b) gravity to surface tension, Bo; (c) viscosity to surface tension and inertia, Oh; and (d) the ratio of inertia to viscosity, St (Table 1). In the limit of small We=1 (effectively, low impact velocity) and large surface Oh (or a solid surface), an initially spherical drop impacting a surface deforms into an ellipsoid with major axes parallel to the surface. The droplet starts to deform when the bounce layer pressure is similar to the internal pressure in the droplet. The height h of the droplet above the surface at which this deformation begins determines the magnitude of the bounce layer thickness and is given by $h=RSt^{2/3}$. For an R=1 mm droplet impacting a glass surface at 0.2 m/s in air the bounce layer thickness is about 4 μm at the center and decreases to 2 μm at the edge. In a gas, the bounce layer acts as an incompressible layer that can only decrease its volume (and thus height) by pressure-driven Poiseuille flow to the edges. If the characteristic oscillation time of the droplet ($1/\omega_d=\sqrt{\rho R^3/\sigma}$) is less than the time for the bounce layer to thin to the point of rupture, the droplet bounces.

Droplet deformation is largely determined by the Weber number We. For We<1, droplets deform very little, but for larger values internal modes of the droplet are excited and deformations can be large. Surprisingly, despite these deformations, the contact duration $t_c$ for millimeter-sized droplets is independent of the collision velocity and increases as $R^{3/2}$, (i.e., as the square-root of the mass) for the range of Weber number (0.3≤We≤37) and diameter (0.2≤D<≤3 mm) studied, indicating that the system behaves as a linear spring-mass oscillator with (for We<2) constant restitution coefficient. Low viscosity droplets (Oh<1) are more likely to disintegrate or eject satellite droplets.

Vibrated Droplets

The first observation of persistent bouncing on a vibrated liquid surface was made in 2005, as noted in Article F. Droplets of silicon oil with $5\times10^{-3}<\eta<1$ Pa s could be made to bounce indefinitely (up to three days of bouncing was observed, limited only by the patience of the researchers) above a minimum surface acceleration, $\Gamma_c$. $\Gamma_c$ is minimum ($\Gamma_c\approx 0.5$) when the ratio of surface and droplet vibration frequency is about 0.6, i.e., $\Omega=\omega/\omega_d=0.6$.

Beyond basic bouncing, vibrated droplets show a rich set of behaviors. In the limit of moderate damping and small deformation, conventional bouncing ball dynamics are observed with period-doubling bifurcations and chaos at larger $\Gamma$. At large We, when higher-order modes of the droplets are excited during coil on and Oh is small, drops have been observed to roll on liquid surfaces due to the presence of resonant internal oscillations. We characterize periodic droplet trajectories, or bouncing modes, using the notation (n,ψ), where n is droplet bounce period measured in surface vibration periods, and ψ is the number of "impacts" of the droplet for each of its periods. For example (1,1) means the droplet bounce period $T_b=T$ and the droplet impacts the surface once during per $T_b$, while (3,2) implies $T_b=3T$ and the droplet approaches the surface twice in its cycle.

To the inventors knowledge, vibrational bounce-layer-mediated levitation of bouncing droplets has not yet been applied to microfluidic transport. The only related work of which the inventors are aware is by Gilet et al., as discussed in Articles G and H, which describe how vibration of droplets on liquid surfaces can be used to delay coalescence with the surface, mix droplets, and reduce droplet size through partial coalescence. However, such work did not teach or suggest the transport of droplets.

The innovation and advantages in the present disclosure relative to previous LoC manipulation methods include, in pertinent part, that the fluid does not contact the device and droplets are not constrained by guiding surface structures and instead can be driven along arbitrary programmable trajectories. This is believed to be the first teaching of methods to control the horizontal movement of vibrationally levitated bouncing droplets.

The present apparatus and methods seek to levitate multiple droplets above solid and liquid surfaces using vertical vibration, and to control the horizontal trajectories of the droplets using periodic horizontal and/or rotational displacement of the surface. Horizontal forces are realized by shear forces developed in the bounce layer between the droplet and nominally rigid surface due to relative differences in their horizontal velocities. For liquid-covered surfaces, the operation is in a parameter regime where surface deformation, due both to droplet interaction and to acceleration of the underlying solid surface, is minimal. This condition is realized when the surface liquid is viscous and shallow. For instance, bouncing was successfully realized under these conditions in earlier work, as discussed in Article I. Since the critical acceleration for droplet stabilization decreases with droplet size, the present manipulation techniques will scale to smaller droplet diameters.

Droplets may be manipulated on the surface by driving the surface in two ways. First, by using translational-only vertical and horizontal vibrations of the surface, creating forces that are the same everywhere on the surface and allowing the parallel manipulation of multiple droplets, creating spatially uniform velocity fields. Second, by allowing the surface to periodically rotate about any or all of its three independent axes (roll, pitch and yaw), spatially varying forcing creates spatially varying velocity fields. Spatially varying fields can concentrate or disperse droplets and are used to independently control the motions of multiple droplets simultaneously, for example, moving droplets along arbitrary trajectories simultaneously.

Single Droplet

This portion of the discussion focuses on the modeling, dynamics and experimental model verification of movement of a single droplet.

Modeling Horizontal and Vertical Forces

Accurate modeling is essential to controlling the bouncing dynamics of droplets since the relative impact velocity largely defines the bounce layer thickness, which in turn determines the viscous shear forces driving the droplet along the surface.

Horizontal Forces

We first address the modeling of viscous forces acting to propel a droplet. As discussed above, for a given droplet and gas, the thickness of the bounce layer h is controlled by the impact velocity, $V_I$:

$$h(V_I) = RSt^{2/3} = R(\eta_g/\rho V_I R)^{2/3}.$$

As shown experimentally in Article J, the lateral extent of the bounce layer, $R_g$, is fairly constant during the collision and is determined by the balance of inertial pressure and bounce layer pressure as $R_g = \sqrt{Rh}$. The net shear force acting on the droplet then is $$F_\eta = \int_A \tau_d dA,$$

where $\tau_d$ is the wall shear stress acting on the bottom of the droplet, i.e., $$\tau_d = \tau(z=h) = \eta_g \frac{\partial u}{\partial z}\bigg|_{z=h},$$

where u(z) is the horizontal gas velocity, and z is the vertical coordinate with origin at the surface. Also, u(z) can be considered to be due to two separate flows, the pressure-driven flow due to the impact and the relative velocity of the droplet and the surface. If the flow is laminar, the pressure-driven flow is symmetric and creates no net flow on the droplet, so it is ignored. Further, if we assume the gas flow is in steady state, the velocity profile associated with the relative motion is linear, $$u(z) = \frac{\Delta u}{h} z,$$

and the wall shear stress is given by $$\tau_d = \frac{\eta_g \Delta u}{h},$$

where $\Delta u$ is the magnitude of the difference in horizontal droplet and surface velocities.

To justify the assumption that the flow is laminar, we calculate the Reynolds number of the flow in the bounce layer, $$Re = \frac{\rho_g \Delta u h}{\eta_g}.$$

Typical velocities for shaking frequencies of f=20 Hz and Γ=1 are $$A\omega = \frac{\Gamma g}{\omega} \approx 0.1 \text{ m/s},$$

which implies that the Reynolds number for a droplet bouncing in air is $Re = 3 \times 10^{-12}$, which means the flow is completely laminar. To justify the assumption that the flow is in steady state, consider that the Rayleigh time to reach steady state for laminar Couette flow is $$h^2/v_g \approx 10^{-7} s = t_c,$$

where $t_c$ is the time that the droplet is interacting with the surface and is on the order of 10 ms for millimeter-sized droplets.

Finally, we estimate the magnitude of the force acting on a D=1 mm drop in air and initially at rest horizontally in the lab frame. The shear force on the droplet is $$F_\tau = \pi R^2 \tau_d \approx 1 \text{ μN}$$

with a corresponding acceleration of $a_d = F_\tau/m = 3$ m/s², where m is the droplet mass and assuming the droplet density is $\rho = 1000$ kg/m³. For an initial velocity difference $\Delta u$, and assuming constant contact, the horizontal droplet velocity $$u_d(t) = \Delta u(1 - e^{-t/t_\eta}), \text{ where } t_\eta = \frac{4\rho Rh}{3\eta_g}.$$

The time for a droplet to reach half the relative velocity is then $$t_{1/2} = \ln(2) t_\eta = 40 \text{ ms},$$

which when scaled by $t_c/T = 0.01 \times 20 = 0.2$, (i.e., the collision time, $t_c$, by the shaking period, T) gives an actual time to reach half the plate velocity of 200 ms, or about 4 impacts.

Vertical Forces

A number of simplified models of vertical gas-mediated bouncing have been proposed and tested against experiments to good agreement. We use the model of Terwagne et al. from Article K, which assumes that inertia is small relative to surface tension (We<1), which implies that droplets are approximately ellipsoidal during collision. In this model the bouncing droplet is treated as two masses, $m_1$ and $m_2$, coupled to each other by a spring of stiffness k and relaxed length L in parallel with a dashpot with damping coefficient c, which accounts for the size of the droplet, its characteristic oscillation frequency $$\omega_d = \sqrt{\sigma/\rho R^2},$$

and its viscosity, as shown in FIG. 9a. The mass in contact with the surface, $m_2$, is acted on by a surface normal force, $N_c$.

The equations of motion of the vertical bouncing model are $$m_1 \ddot{z}_1 = -m_1 g - k(z_1 - z_2 - L) - c(\dot{z}_1 - \dot{z}_2),$$

$$m_2 \ddot{z}_2 = -m_2 g + k(z_1 - z_2 - L) + c(\dot{z}_1 - \dot{z}_2) + N_c.$$

Collision with the surface occurs when $z_2<L_c$ and ends when $z_2>L_c$. In addition, droplet vibrations during free flight can either be treated: (1) as completely damped, so that before each collision the droplet is spherical which, in the model, corresponds to $z_1-z_2=L$ and $\dot{z}_1-\dot{z}_2=0$, simplifying the modeling; or (2) as underdamped, in which case the initial conditions at impact depend on the previous bounce. In either case, the model must be solved numerically due to the trigonometric functions describing the surface motion. Model coefficients are initially estimated as follows: $m_1=m_2=m/2$, where m is the droplet mass; $k=\sigma$; and C is found by equating the damping ratio $$\xi = \frac{c}{2\sqrt{2kM}}$$

with Oh.

Bouncing Dynamics

Figure 9B:
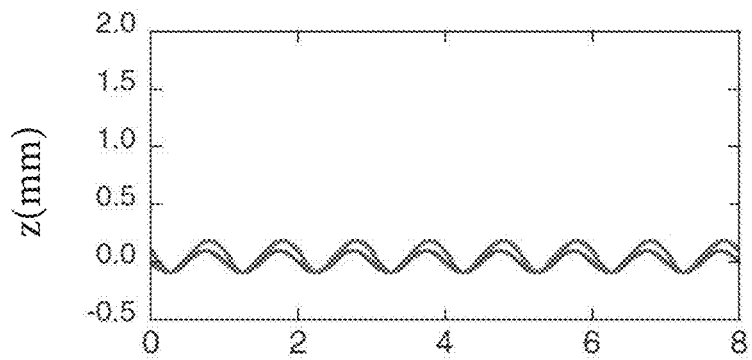
FIGS. 9b-9d show prior art representations of vertical surface motion (lower curve) and a droplet bouncing trajectory (upper curve) from an experiment with an 890 μm diameter droplet with viscosity, v=20 cSt.
Figure 9C:
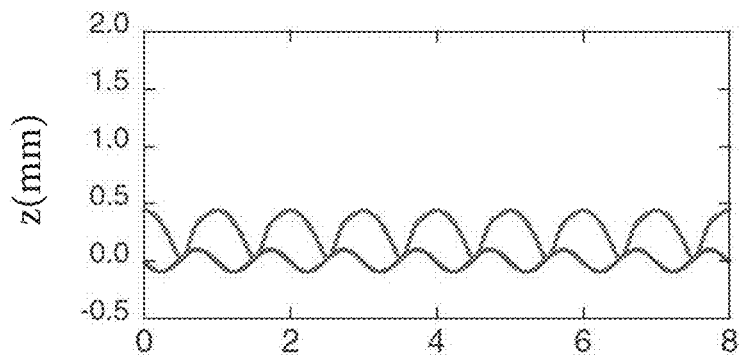
Figure 9D:
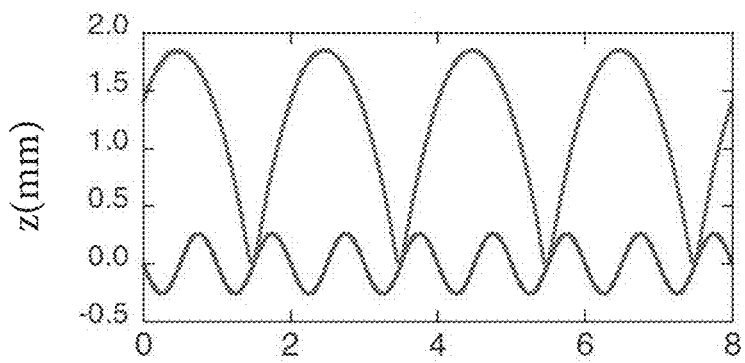

The droplet-surface interaction model is useful to describe the dependence of the vertical bouncing behavior on $\Gamma$ for three distinct modes of bouncing characterized by their bounce height, wherein examples of surface motion (in a lower curve) and different bouncing trajectories (in an upper curve) are shown from experiments with a D=890 μm droplet with ν=20 cSt: FIG. 9b low bounce (1,1); FIG. 9c high bounce (1,1); FIG. 9d period-2 bouncing (2,1), with the images being adapted from those shown in Article L.

In high bouncing, significant horizontal shear forces are exerted on the droplet only during a small fraction of the bouncing cycle when the bounce layer is relatively thin. In this mode, the vertical surface acceleration is adjusted so that the droplet impacts the surface just before the apex of the surface's motion, as shown in FIG. 9c. After bouncing, the thickness of the bounce layer between the droplet and the surface is large, which means shear forces due to the relative horizontal movement of droplet and nominally rigid surface are negligible. For fixed horizontal acceleration, the phase of the horizontal acceleration will be adjusted to vary the horizontal surface acceleration at impact. For example, for $a_x=A_x\omega^2 \sin(\omega t+\phi_x),$ $z_z=A_z\omega^2 \sin(\omega t),$ the steady state velocity of the droplet will be maximal for $\phi_x \approx \pi/2$.

In low bouncing, the droplet remains close to the surface throughout the surface oscillation cycle by keeping $\Gamma$ just above $\Gamma_c$, as shown in FIG. 9b. Because the bounce layer is relatively thin (but varying in time) the average horizontal forces acting on the droplet must be calculated by integrating the shear stress over the entire cycle:

$$\vec{F}_\tau = \pi R^2 \int_0^T \frac{\eta_g [\vec{u}(t) - \vec{u}_s(t)]}{h(t)} dt,$$

where $\vec{u}_s(t)$ and h(t) are directly determined by the surface motion and vertical bouncing dynamics of the drop. Velocity limit cycles are identified by integrating the equations of motion to identify droplet motions with $$\frac{1}{T}\int_0^T \vec{F}_\tau(t')dt' = 0.$$

In this regime, in addition to the inverse Stokes number which characterizes the impact pressure, the modified Bond number plays an important role in determining the bounce layer thickness as the collisions velocities are small. The Bond number $Bo=\rho g R^2/\sigma$ is modified to take into account the acceleration of the surface and becomes $Bo_m=\rho(g+a_z)R^2/\sigma$. Thus h, and therefore the strength of the viscous coupling, can additionally be changed by details of the vertical acceleration of the surface.

For large enough $\Gamma$, the period of the droplet bouncing mode, $T_b$, is no longer equal to the surface oscillation period, but is instead an integer multiple of it:

$T_b=nT, n\in(2,3,\dots)$ (see FIG. 9d for $T_b=2T$). In the simplest case, the droplet only interacts with the surface once per $T_b$ and there are n degenerate bouncing modes, the kinematics of each being separated from the next by T. For the case shown in the figure, a second droplet could impact the surface at approximately the same time the droplet shown is reaching its apex. The forces acting on each distinct bouncing mode can be separately specified by breaking their degeneracy using the horizontal shaking frequency. If $\omega_x=\omega_z/n$, the horizontal velocity of the plate during droplet touchdown can be distinct for each of the n bouncing modes. For $T_b=2T$, two sets of droplets can be driven in different directions using subharmonic horizontal driving.

The existence and extent in $\Gamma$ of higher-period bouncing modes depends on droplet and surface properties. In addition to the $T_b=2T$ bouncing mode shown, period-3 and period-4 bouncing modes are possible, which allow the forces, and thus the velocities, on corresponding numbers of sets of droplets to be separately specified. Also, in addition to impulsive forcing, a hybrid of impulsive and continuous horizontal forcing is possible for multi-period bounce modes if the droplet is close to the surface for a significant fraction of its trajectory.

Apparatus and Method

It will be understood that a variety of structures may be used for the apparatus, and depending on the apparatus chosen, various methods may be employed. The apparatus could be as simple as a single degree of freedom device, and we have shown capability of operating with a six degree of freedom device. With any apparatus, the movement of one or more droplets will be achieved by use of simultaneous vertical and horizontal vibrations, to levitate (bounce) and drive the droplet motion. Moreover, solid and fluid surfaces may be used by structuring the apparatus to simply have a top surface, such as in the form of a flat plate, or having a containment area for holding liquid that will present an operative top surface. Liquid surfaces have the advantage of being smoother than solid substrates and being partially self-cleaning in that dust or other unwanted material that fall on them can be absorbed beneath the surface of the liquid. However, the liquid surface should be shallow so that waves are not excited on its surface by vibration, so that the liquid does not slip substantially with respect to the underlying support as the support moves horizontally, and so that the collision dissipation, characterized by the restitution coefficient, is not too large. Flat and thin liquid layers can be readily formed by employing a fully wetted porous surface which allows precise control of liquid layer depth and which exhibits restitution coefficients similar to solid dry surfaces.

A video camera may record droplet movement from overhead, while a high speed camera viewing the system from the side captures the details of droplet bouncing. Vision data from a side view camera may be used to identify a vertical bouncing mode for droplet and driving parameters with multiple possible trajectories. Images from an overhead camera can provide feedback to a vibration controller, for instance, determining when the controller should switch between various velocity fields. The controller may include a computer, microprocessor or other suitable programmable device. As a simple example of a control algorithm employing vision feedback and just two fields capable of translating the droplet at a uniform velocity along either the x or the y axes consider the following. A droplet could be made to follow a spot of light projected on the surface by using vision data to calculate the x and y differences in position between the droplet and the spot and then having the controller apply vibrations to the actuators corresponding to the x or y velocity field according to whichever of the two differences was larger.

Figure 10:
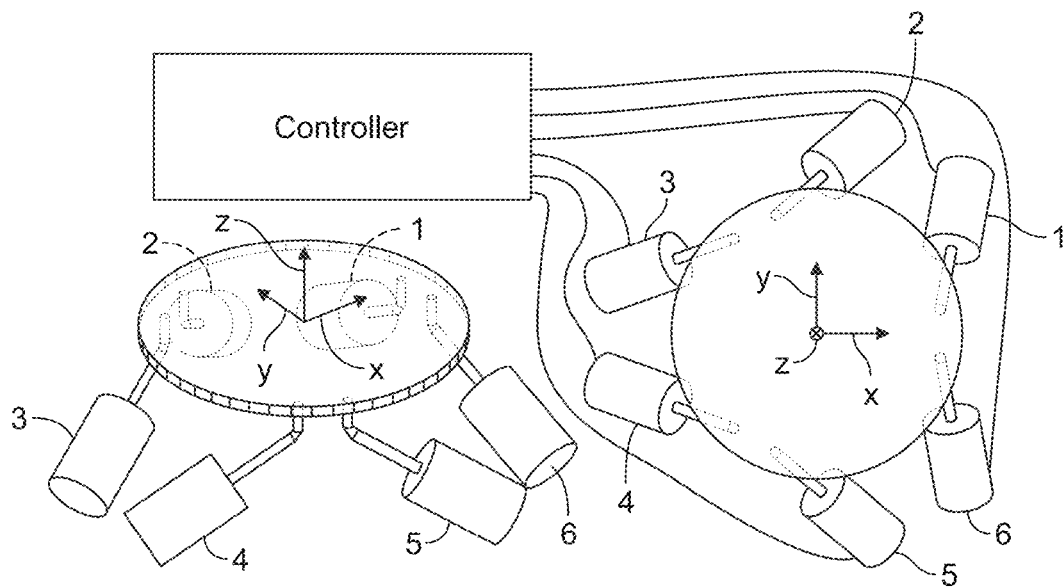
FIG. 10 shows two views of a sketch of an example apparatus having a 6-degree-of freedom flexure coupled vibratory device connected to a controller.

An example of an apparatus with six degrees of freedom and capable of levitating and horizontally translating droplets is shown in FIG. 10. The apparatus consists of six linear actuators (motors) coupled to a rigid circular plate by six mechanical flexures, and to a controller. By driving each of the six motors with the appropriate electrical current, the plate is able to achieve primitive periodic motions consisting of translation in the x-s- and z-directions and rotation about the x-, y-, and z-axes (i.e., roll, pitch, and yaw motions, respectively) independently or simultaneously depending on the driving currents to each motor. For this example, the motion of the plate is measured by accelerometers mounted to the plate. The plate trajectory is controlled by a computer that compares the actual plate motion to the desired plate motion and, using feedback, modifies the current supplied to the motors so the desired motion is realized.

Figure 11:
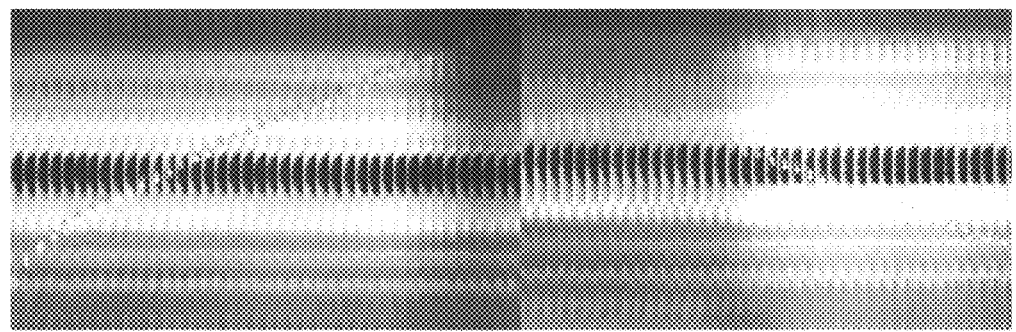
FIG. 11 shows image sequences of a levitated droplet being transported horizontally, with each thin slice in the horizontal direction being a thin-slice camera image, and time increases to the right.

Preliminary experiments with a 1 mm deep liquid surface layer and 1-2 mm droplets verify the proposed manipulation method. FIG. 11 shows stable bouncing droplets were readily formed at $\Gamma=1.4$, and droplets were successfully driven back and forth across the liquid surface using horizontal acceleration $a_y$. The image sequences show a droplet moving up for $\phi_y=\pi/2$ and down for $\phi_y=-\pi/4$ using $a_y=A_y\omega^2 \sin(\omega t+\phi_y)$, and $a_z=A_z\omega^2 \sin(\omega t)$, with $A_z=14\omega^2$ m/s$^2$, $A_y=2\omega^2$ m/s$^2$, and $\omega/2\pi=20$ Hz. Each thin slice in the horizontal direction is a thin-slice cameral image. Each image slice is taken from the center of the frame, and time increases to the right. A droplet was formed at the left of each subimage by disturbing the surface and quickly reached a constant velocity of $\approx 1.5$ cm/s, as indicated by the slope of the droplet track, which is similar to the maximum horizontal surface velocity of 2 cm/s. Time between frames is 1/15 s.

Figure 12:
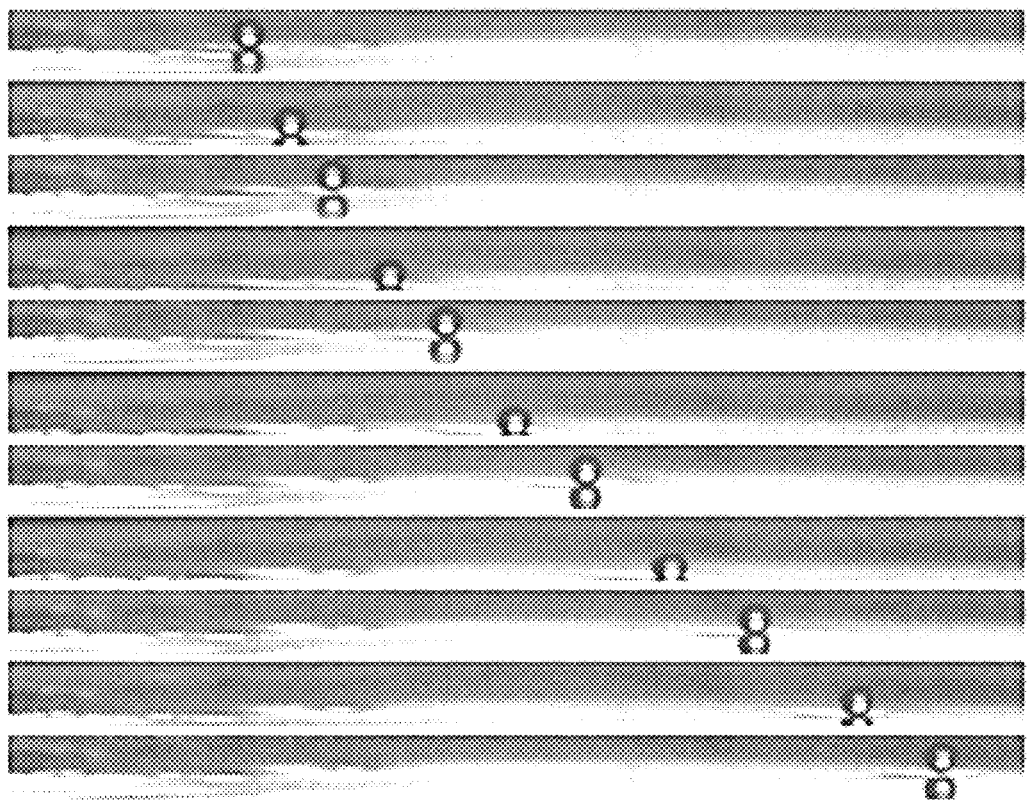
FIG. 12 shows a side-view image sequence of a levitated droplet being transported horizontally.

Similarly, FIG. 12 shows a sequence of images taken from the side of a 1 mm droplet of 20 cSt silicone oil being transported to the right on a surface covered by a 0.4 mm deep layer of the same fluid and vibrated at 26 Hz with a vertical acceleration amplitude of 10 m/s$^2$, and a horizontal acceleration amplitude of vibration of 3 m/s$^2$. The elapsed time between frames is approximately 1 s and, because the sampled frames are not synchronized with the vibration frequency, the vertical motion and slight deformation during the bounce of the droplet is also observable.

Figure 13:
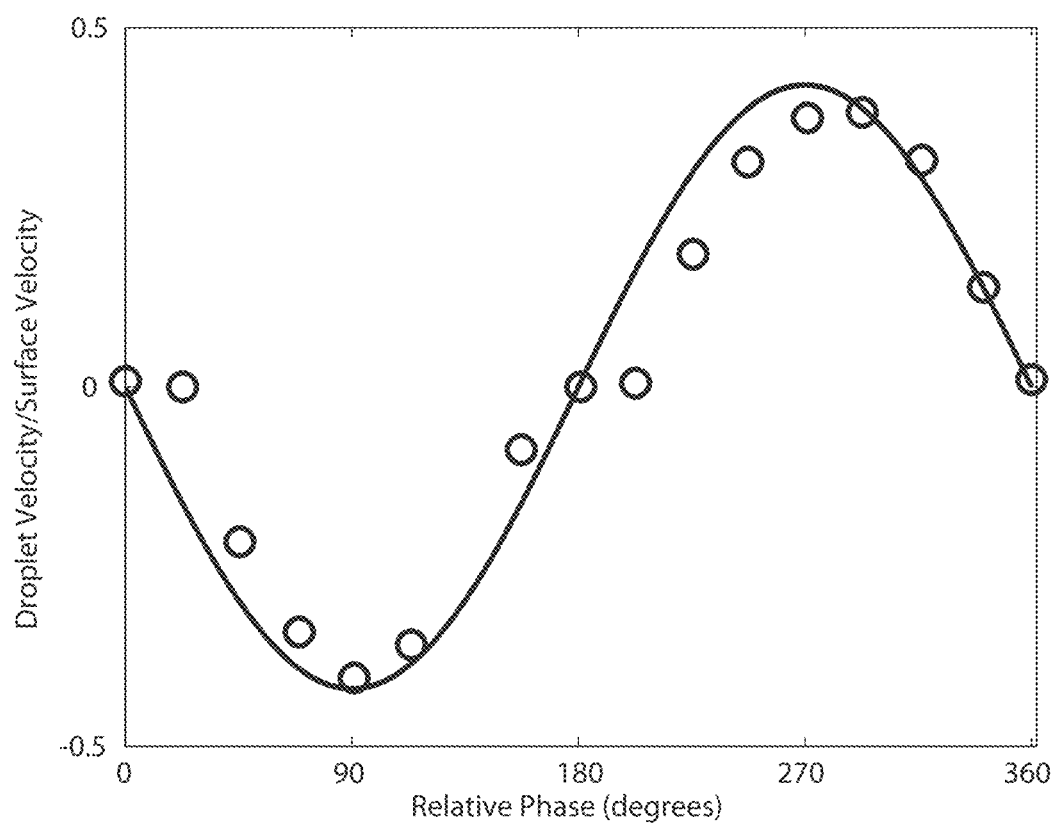
FIG. 13 shows a plot of the horizontal droplet speed vs. the phase of the horizontal vibration relative to the vertical vibration.

As discussed above, the cycle averaged shear generating the horizontal drop motion is a function of the relative phasing between the local horizontal and local vertical oscilltions of the surface. FIG. 13 shows that the droplet speed (circle symbols) varies nearly sinusoidally (solid curve) with the relative phase between the horizontal and vertical vibration as expected from the analysis of the viscous shear forces in the bounce layer.

Multiple Droplets in Uniform Fields

To realize parallel control, multiple droplets may be driven simultaneously, such as under translational surface vibration in three dimensions. Surface accelerations are of the form:

$a_x = A_x\omega^2 \sin(\omega t+\phi_x)$ horizontal motion:

$a_y = A_y\omega^2 \sin(\omega t+\phi_y)$ $a_z = A_z\omega^2 \sin(\omega t)$, vertical motion:

which are characterized by five parameters where the phase of the vertical vibration has been set to zero without loss of generality.

Figure 14:
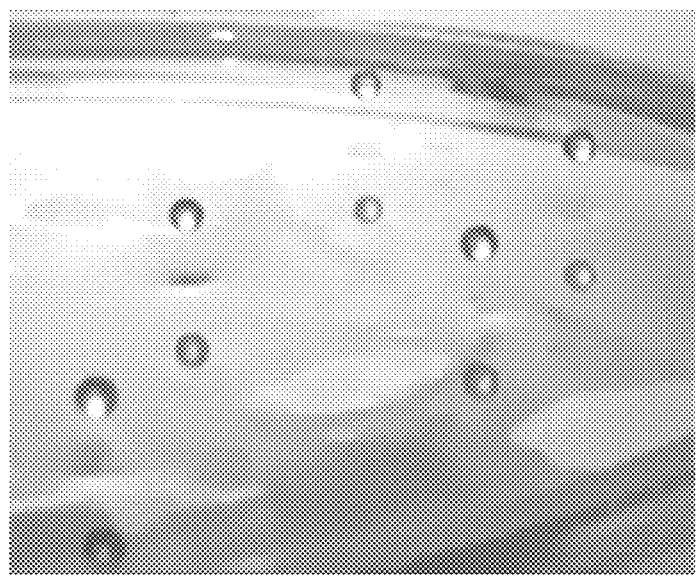
FIG. 14 shows a side view of an experiment having 20 cSt silicone oil droplets levitated above a bath of 1000 cSt silicone oil.

When all droplets are in the same bouncing mode and in phase as shown in FIG. 14, the dynamics reduce to that of single droplet motion (see above Single Droplet). With translation-only driving of the surface, all droplets move in lockstep (see FIG. 6) for (1,1) vertical trajectories. For example, all droplets can be made to move in the same direction at the same velocity at any point on the surface, i.e., a constant velocity vector field.

When droplets do not all bounce with the same phase due to higher period bouncing modes [(1, $\psi$>1) or (n>1, $\psi$),] (see above Bouncing Dynamics), droplets may follow different co-existing but distinct uniform velocity fields or force fields, depending on their bouncing phase. For example, all droplets bouncing with one phase may move to the left, while all droplets bouncing with a different phase may move to the right.

Multiple Droplets in Non-Uniform Fields

Figure 15:
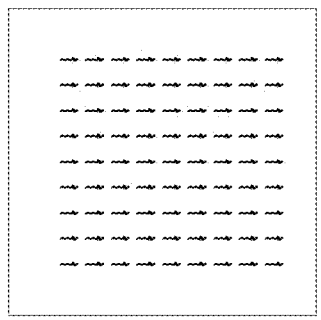
FIG. 15 shows a variety of velocity fields realized by varying the periodic surface motion.
Figure 15:
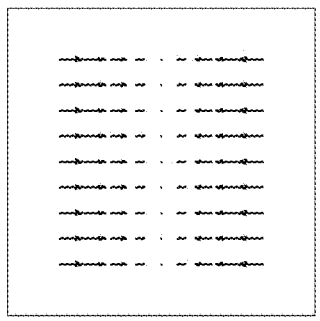
Figure 15:
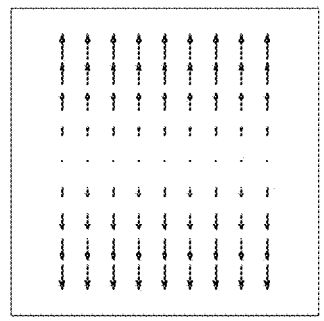
Figure 15:
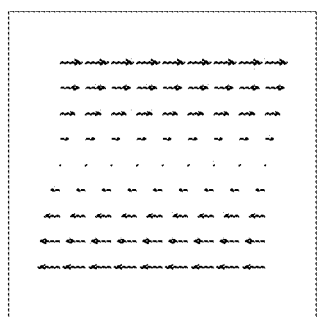
Figure 15:
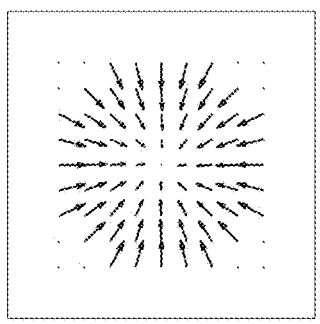
Figure 15:
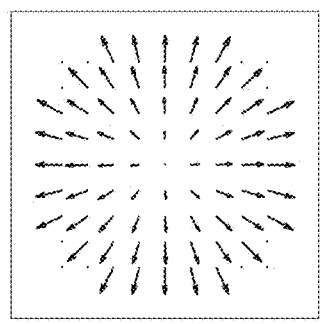
Figure 15:
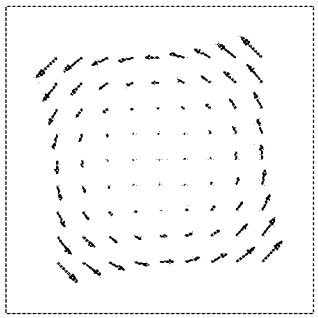
Figure 15:
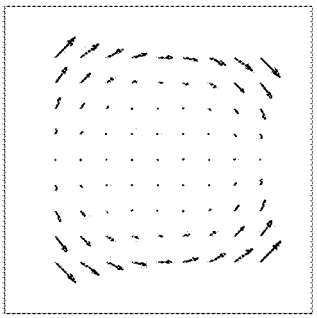
Figure 15:
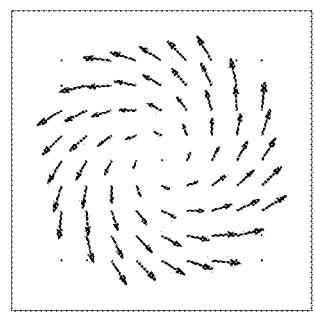

Droplet manipulation may occur where the strength and direction of the forcing varies across the surface due to periodic rotations of the surface. Non-trivial velocity fields, with and without divergence, can be created using periodic rotations of the surface, see FIG. 15 for several examples, such as, at least one of translation, shear, sink, source, linesink, linesource, circle, divcircle, and spiral patterns, or combinations thereof. Non-uniform velocity fields will be achieved using periodic surface rotations with angular accelerations $\alpha_i$ in addition to vertical and horizontal vibrations:

$\alpha_x = B_x\omega^2 \sin(\omega t+\beta_x)$, $\alpha_y = B_y\omega^2 \sin(\omega t+\beta_y)$, $\alpha_z = B_z\omega^2 \sin(\omega t+\beta_z)$.

To understand how rotations lead to spatially varying forcing, consider the effect of simultaneous vibration along and about the Z-axis (vertical axis):

$a_z = A_z\omega^2 \sin(\omega t)$, $\alpha_z = B_z\omega^2 \sin(\omega t+\beta_z)$.

A droplet bouncing along the vertical rotation axis will not move horizontally. However, a distance r away from the Z-axis the surface will oscillate in the plane with a maximum velocity of $rB_z\omega$ in the $\hat{\theta}_z$ direction and the droplet is likely to move outward in a spiral with increasing speed.

As another example, vary the magnitude of the vertical acceleration by rotating the surface about a horizontal axis, $\alpha_x=B_x\omega^2 \sin(\omega t/2)$. The vertical acceleration amplitude due to rotation is $rB_x\omega^2$, where r is the distance from the rotation axis. With increasing r, the local acceleration will increase from 0, pass the critical acceleration for sustained bouncing of $\Gamma_c$ at $r=\Gamma_c/(B_x\omega^2)$, and eventually become large enough that droplets will have multi-period trajectories. Additionally, the vertical acceleration will be 180° out of phase across the rotation axis. Adding horizontal acceleration $a_x = A_x \omega^2 \sin(\omega t)$ causes droplets at different r to experience different planar forces as a function of r, creating a highly nonlinear velocity field.

Combinations of Velocity Fields

It will be appreciated that the primitive periodic motions that create velocity fields can be sequenced in time, such as, shifting from a circle field to a shear field, or they may be applied simultaneously.

Ensemble Controllability

We use non-uniform velocity fields to provide ensemble control, in which uniform and limited inputs (i.e., surface accelerations) are used to control the configuration of many individual droplets simultaneously. Similar work in the field of robotics by Becker et al. has shown that it s possible to control the group configuration of many mobile robots each implementing the same motion, provided that each robot has slightly different characteristics. For our system, the differences are associated with position in a non-uniform vector field, rather than any intrinsic difference between droplets. It is believed that the possibility to control many droplets simultaneously comes primarily from the dimensionality of the driving waveform control parameters, rather than the number of actuators.

Droplet Mixing

The vertical and horizontal vibrations intrinsic to the method and apparatus can be used to enhance mixing within multi-component droplets and to merge and then mix separate droplets composed of different components. For example, two droplets composed of different components and placed at different locations on the surface under the control of the sink velocity field described in FIG. 15 will move to the center of the field and merge. At the center of the field the flowing material in the vertically bouncing droplet moves in an oscillatory dipole-like field with a vertical symmetry axis which enhances mixing relative to a quiessent droplet. Further enhancement in mixing is achieved by applying a velocity field which causes the droplet to move horizontally; this results in a net external shear force on the droplet which both sets up a secondary flow within the droplet and causes the droplet to rotate wherein the orientation of the flowing material within the droplet is changed with respect to the internal vertical dipole-like flow field created through vertical impact.

The foregoing detailed description and accompanying drawings have been provided by way of explanation and illustration, and are not intended to limit the scope of the appended claims. Many variations in the presently preferred examples illustrated herein will be apparent to one of ordinary skill in the art, and remain within the scope of the appended claims and their equivalents. Also, the following references are referred to within the above description.

REFERENCES

[A] Kaler, Karan V. I. S. and Prakash, Ravi. Droplet Microfluidics for Chip-Based Diagnostics. *Sensors*, 14(12): 23283-23306, 2014.

[B] Mark, Daniel and Haeberle, Stefan and Roth, Gunter and von Stetten, Felix and Zengerle, Roland. Microfluidic lab-on-a-chip platforms: requirements, characteristics and applications. *Chem. Soc. Rev.*, 39:1153-1182, 2010.

[C] Shastry, Ashutosh and Taylor, Dane and Beihringer, Karl F. Micro-structured surface ratchets for droplet transport. *Transducers and EuroSensors '07*, pages 1353-1356, 2007.

[D] Drinkwater, B. W. Dynamic-field devices for the ultrasonic manipulation of microparticles. *Lab on a Chip*, 16:2360, 2016.

[E] Kashima, R and Koyama, D. and Matsukawa, M. Two-dimensional noncontact transportation of small objects in air using flexural vibration of a plate. *IEEE T ULTRASON FERR*, 62:2161-2168, 2015.

[F] Couder, Y and Protiere, S and Fort, E and Boudaoud, A. Dynamical phenomena—Walking and orbiting droplets. *Nature*, 437(7056):208, 2005.

[G] Gilet, T. and Vandewalle, N. and Dorbolo, S. Controlling the partial coalescence of a droplet on a vertically vibrated bath. *Phys. Rev. E*, 76:035302(R), 2007.

[H] Gilet, T. and Terwagne, D. and Vandewalle, N. and Dorbolo, S. Manipulation of Droplets onto a Planar Interface. In Miller, R and Liggieri, L, editors, *Bubble And Drop Interfaces* in Progress in Colloid and Interface Science, pages 503-520. CRC Press, 2011.

[I] Gilet, Tristan and Bush, John W. M. Droplets bouncing on a wet, inclined surface. *Physics of Fluids*, 24(12), 2012.

[J] de Ruiter, Jolet and Lagraauw, Rudy and van den Ende, Dirk and Mugele, Frieder. Wettability-independent bouncing on flat surfaces mediated by thin air films. *Nature Physics*, 11(1):48-53, 2015.

[K] Trietsch, S. J. and Hankemeier, T. and van der Lineden, H. J. Lab-on-a-chip technologies for massive parallel data generation in the life sciences: A review. *Chemometrics and Intelligent Laboratory Systems*, 108:64-75, 2011.

[L] Terwagne, D. and Ludewig, F. and Vandewalle, N. and Dorbolo, S. The role of the droplet deformations in the bouncing droplet dynamics. *Physics of Fluids*, 25(12), 2013.

We claim:

1. A method of imparting movement to one or more droplets comprising:
    placing the one or more droplets above a nominally rigid surface of a support member, wherein the one or more droplets and the nominally rigid surface of the support member are within or surrounded by an ambient fluid comprising a liquid or gas, and
    imparting vibratory motion to the support member, wherein the vibratory motion of the support member includes a locally time-varying vertical component of motion and a locally time-varying horizontal component of motion, and wherein a bounce layer formed from the ambient fluid and the vibratory motion prevent the one or more droplets from wetting or coalescing with the surface of the support member and produces movement of the one or more droplets tangent to the surface of the support member.

2. The method of claim 1 wherein the nominally rigid surface of the support member is a solid surface or a liquid-covered surface, wherein the liquid covering the surface differs from the ambient fluid.

3. The method of claim 1 wherein the support member comprises a wetted porous substrate.

4. The method of claim 3 wherein wetting of the porous substrate enables control of a depth of liquid on the porous substrate and a reduction in dissipation of the liquid allowing levitation via bouncing of a droplet at lower vertical accelerations.

5. The method of claim 1 wherein the nominally rigid surface of the support member is flat.

6. The method of claim 1 wherein the one or more droplets further comprise a liquid, a gel, a colloid, an emulsion or a liquid-coated particle.

7. The method of claim 1 wherein the time-varying motion of the nominally rigid surface of the support member includes motion in one or more of the z, roll, or pitch directions.

8. The method of claim 7 wherein the time-varying motion of the nominally rigid surface of the support member further includes motion in one or more of the x, y, and yaw directions.

9. The method of claim 1 wherein the motion of the nominally rigid surface of the support member is periodic.

10. The method of claim 9 wherein the periodic motion of the nominally rigid surface of the support member is sinusoidal or the sum of sinusoids with controllable magnitudes and phasing.

11. The method of claim 9 wherein the periodic motion of the nominally rigid surface of the support member creates force fields or velocity fields as functions of the horizontal position of the droplet on the nominally rigid surface of the support member, the bouncing mode of the droplet, and the bouncing phase of the droplet with respect to the surface motion.

12. The method of claim 11 further comprising creating various types of force fields and velocity fields on the nominally rigid surface of the support member, with and without divergence in at least one of translation, shear, sink, source, linesink, linesource, circle, divcircle, and spiral patterns, or combinations thereof.

13. The method of claim 11 wherein droplets with different bouncing modes or different bouncing phases or combinations thereof are simultaneously subject to different force or velocity fields.

14. The method of claim 9 further comprising sequences of different periodic motions of the nominally rigid surface of the support member.

15. The method of claim 14 wherein fields are sequenced using feedback to control the motion of one or more droplets individually.

16. The method of claim 15 further comprising using vision-based feedback to control motion of the one or more droplets.

17. The method of claim 1 wherein movement of the one or more droplets is used to mix multi-component droplets.

18. The method of claim 17 wherein the mixing is caused by collisions between two or more bouncing droplets.

19. The method of claim 17 wherein flowing material in a vertically bouncing droplet moves in an oscillatory dipole-like field with a vertical symmetry axis and enhanced mixing is caused by horizontal movement of the droplet via a net external shear force on the droplet which both sets up a secondary flow within the droplet and causes the droplet to rotate wherein the orientation of the flowing material within the droplet is changed with respect to the internal vertical dipole-like flow field created through vertical impact.

20. An apparatus for imparting movement to one or more droplets comprising:
a support member having a nominally rigid surface above which the one or more droplets are disposed, wherein the one or more droplets and the nominally rigid surface of the support member are within or surrounded by an ambient fluid comprising a liquid or gas,
one or more actuator devices configured for imparting vibratory motion to the support member, wherein the vibratory motion includes a locally time-varying vertical component of motion and a locally time-varying horizontal component of motion, and
a controller programmed to provide electrical signals to the one or more actuator devices, wherein a bounce layer formed from the ambient fluid and the vibratory motion is configured to prevent the one or more droplets from wetting or coalescing with the nominally rigid surface of the support member or from contacting the nominally rigid surface of the support member and is configured to produce movement of the one or more droplets tangent to the nominally rigid surface of the support member.

21. The apparatus of claim 20 wherein the nominally rigid surface of the support member is a solid surface or a liquid-covered surface, wherein the liquid covering the surface differs from the ambient fluid.

22. The apparatus of claim 20 wherein the controller is programmed to provide electrical signals to the one or more actuator devices, wherein a desired force field, or velocity field is specified to the controller and the controller includes a translator that converts the desired field to a desired periodic vibration profile of the support member.

23. The apparatus of claim 20 further comprising a control algorithm configured to convert desired motions of the droplets into support member vibrational profiles.

* * * * *